(12) United States Patent
Ranstad

(10) Patent No.: US 7,649,753 B2
(45) Date of Patent: Jan. 19, 2010

(54) POWER SUPPLY FOR ELECTROSTATIC PRECIPITATOR

(75) Inventor: Per Anders Gustav Ranstad, Vaexjoe (SE)

(73) Assignee: Alstom Technology Ltd, Baden (CH)

( * ) Notice: Subject to any disclaimer, the term of this patent is extended or adjusted under 35 U.S.C. 154(b) by 182 days.

(21) Appl. No.: 11/812,888

(22) Filed: Jun. 22, 2007

(65) Prior Publication Data
US 2007/0297200 A1    Dec. 27, 2007

(30) Foreign Application Priority Data
Jun. 23, 2006    (EP) .................................. 06115978

(51) Int. Cl.
*H02M 3/335*    (2006.01)
(52) U.S. Cl. .................................. 363/21.02
(58) Field of Classification Search .................. 363/16, 363/17, 35, 210.02, 95, 98, 131, 132, 21.02
See application file for complete search history.

(56) References Cited

U.S. PATENT DOCUMENTS

| | | | |
|---|---|---|---|
| 3,697,717 A | | 10/1972 | Kornrumpf et al. |
| 5,668,707 A | * | 9/1997 | Barrett .......................... 363/44 |
| 6,461,405 B2 | * | 10/2002 | Reyes .............................. 95/7 |
| 6,924,991 B2 | * | 8/2005 | Skeist et al. ............. 363/21.02 |
| 7,054,411 B2 | * | 5/2006 | Katcha et al. ................ 378/101 |
| 2001/0006469 A1 | * | 7/2001 | Grass ........................... 363/37 |
| 2003/0179595 A1 | | 9/2003 | Kleveland | 
| 2007/0070660 A1 | * | 3/2007 | Tallam ......................... 363/44 |

FOREIGN PATENT DOCUMENTS

WO    WO 02/27908 A1    4/2002
WO    WO 02/49197 A2    6/2002

OTHER PUBLICATIONS

Sabate, J.A. et al., "Analysis and Design-Optimization of LCC Resonant Inverter for High-Frequency AC Distributed Power System." IEEE Transactions on Industrial Electronics, IEEE Service Center, Piscataway, NJ, vol. 42, No. 1, Feb. 1, 1995, pp. 63-70.
Jaafari, A. et al., "A Compact High Voltage Low Frequency Power Supply." Applied Power Electronics Conference and Exposition, 1995, Conference Proceedings, Tenth Annual, Dallas, TX, Mar. 5-9, 1995, IEEE, New York, NY, Mar. 5, 1995, pp. 821-825.
European Search Report issued in European Patent Application No. EP 06 11 5978.6 on Mar. 3, 2007.

* cited by examiner

*Primary Examiner*—Bao Q. Vu
*Assistant Examiner*—Nguyen Tran
(74) *Attorney, Agent, or Firm*—Buchanan Ingersoll & Rooney PC

(57) ABSTRACT

An exemplary embodiment of the disclosure pertains to a high-voltage AC-DC converter converting alternating input current into high-voltage direct current to be provided to a load, e.g. for use of powering an electrostatic precipitator. The converter includes at least one unit for the conversion of the alternating (AC) input current into high frequency alternating (AC) current, at least one transformer for adapting the high frequency alternating (AC) current to requirements of the load. A series loaded resonant tank is provided between the at least one unit and the at least one transformer. Modularizing of the topology is achieved in that there are at least two units for the conversion of the alternating (AC) input current into high frequency alternating (AC) current connected to the same transformer.

20 Claims, 3 Drawing Sheets

POWER SUPPLY FOR ELECTROSTATIC PRECIPITATOR

RELATED APPLICATIONS

This application claims priority under 35 U.S.C. Å119 to EP Application 06115978.6 filed in Europe on Jun. 23, 2006, the entire contents of which are hereby incorporated by reference in their entireties.

TECHNICAL FIELD

The present invention relates to power supplies e.g. for high-voltage DC-applications, such as for electrostatic precipitators. Particularly it concerns a converter comprising a unit for the conversion of alternating (AC) input current into high frequency alternating (AC) current, and at least one transformer for adapting the high frequency alternating (AC) current to requirements of the load, wherein between said unit and said transformer there is provided a resonant tank.

BACKGROUND OF THE INVENTION

In many contexts, especially in flue gas cleaning, electrostatic precipitators (ESP) are highly suitable dust collectors. Their design is robust and they are very reliable. Moreover, they are most efficient. Degrees of separation above 99.9% are not unusual. Since, when compared with fabric filters, their operating costs are low and the risk of damage and stoppage owing to functional disorders is considerably smaller, they are a natural choice in many cases. In an electrostatic precipitator, the polluted gas is conducted between electrodes connected to a high-voltage rectifier. Usually, this is a high-voltage transformer with thyristor control on the primary side and a rectifier bridge on the secondary side.

This arrangement is connected to the ordinary AC mains and thus is supplied at a frequency which is 50 or 60 Hz.

The power control is effected by varying the firing angles of the thyristors. The smaller the firing angle, i.e. the longer conducting period, the more current supplied to the precipitator and the higher the voltage between the electrodes of the precipitator.

Modern power supplies for these ESP are so-called series loaded resonant converters (SLR) which allow to have high-power (typically in the range of 10-200 kW) and high-voltage (50-150 kV DC) while at the same time keeping switching losses at a minimum. The focus of the R&D is higher output power.

The used topology is a series loaded resonant converter, SLR, e.g. as given in FIG. 1. The three phase mains with the three phases 1-3 which can be individually switched by switches 4, is rectified by a six-pulse rectifier 6 e.g. comprising diodes 5. This rectifier may however also be an actively switched rectifier. The rectified voltage is smoothed by a DC-link capacitor 13 in the DC-link 6. The DC link voltage is fed to a transistor bridge 8 (H-bridge), comprising four transistors 14, 14', 15, 15'. The output of the bridge 8 (high frequency AC voltage) is connected, via a resonant tank 9, to the primary of a transformer 10. The resonant tank 9 comprises an inductor 16 and a capacitor 17 in series and together with the primary winding 18 these elements are basically defining the resonance frequency of the resonant tank, which correspondingly can only reasonably be operated around this resonance frequency. The transformer 10, consisting of the primary winding 18 and the secondary winding 19, adapts the input voltage (mains) to the load 12 (ESP, 50-150 kV). The secondary alternating voltage of the transformer 10 is rectified by a high voltage rectifier 11 and fed to the load 12. The output voltage is normally negative.

The power flow in such a topology can be controlled either by varying the frequency of the bridge 8 or by varying the duty ratio of the voltage source (bridge output). Switching frequencies in the vicinity of the resonance of the tank are within normal operation.

Resonant power converters contain resonant L-C networks whose voltage and current waveforms vary sinusoidally during one or more subintervals of each switching period.

These sinusoidal variations are large in magnitude, and the small ripple approximation does not apply. The chief advantage of resonant converters is the reduced switching loss (zero-current switching, zero-voltage switching). Turn-on or turn-off transitions of semiconductor devices can occur at zero crossings of tank voltage or current waveforms, thereby reducing or eliminating some of the switching loss mechanisms. Hence resonant converters can operate at higher switching frequencies than comparable pulse width modulation converters. Zero-voltage switching also reduces converter-generated electromagnetic impulses, and zero-current switching can be used to commutate silicon controlled rectifiers. In specialized applications, resonant networks may be unavoidable, so in high voltage converters there is a significant transformer leakage and inductance and winding capacitance leads to resonant network.

There are however also disadvantages to series or parallel resonant tanks. For example the performance can be optimized at one operating point, but not with a wide range of input voltage and load power variations. Further significant currents may circulate through the tank elements, even when the load is disconnected, leading to poor efficiency at light load. Quasi-sinusoidal waveforms exhibit higher peak values than equivalent rectangular waveforms. These considerations lead to increased conduction losses, which can offset the reduction in switching loss. Resonant converters are usually controlled by variation of switching frequency. In some schemes, the range of switching frequencies can be very large In order to increase the power handling capability and to establish a scaleable design, modularizing is used. The fundamental issue when modularizing is to control the load sharing i.e., to secure that different modules take equal or well defined shares of the load.

SUMMARY

One of the objectives of the present invention is therefore to provide an improved high-voltage AC-DC or AC-AC converter converting alternating current into high-voltage direct current or into high-voltage alternating current, respectively, to be provided to a load. Specifically, the improvement relates to a converter comprising a unit for the conversion of the alternating input current into high frequency alternating current, and comprising at least one transformer for adapting the high frequency alternating current to the requirements of the load, wherein between said unit and said transformer there is provided a resonant tank.

The maintenance of an equal load sharing among the circuits when modularizing the system can be achieved in that there is provided more than one, so at least two units for the conversion of the alternating (AC) input current into high frequency alternating (AC) current connected to the same transformer. These units are the so-called primary circuits normally consisting of an input rectifier, a DC link filter and a transistor bridge.

The resonant tank can be a series loaded resonant tank or a parallel resonant tank, it is however preferred to have a series loaded resonant tank.

In case of a series loaded resonant tank, the resonant tank comprises at least one first inductor and at least one capacitor in series connected to a first pole of the primary winding of the transformer, wherein the capacitor is located between the inductor and the primary winding of the transformer.

In order to adjust the resonance frequency and the general behaviour of the resonant tank, it is possible to place a second inductor between at least one unit and a second pole of the primary winding of the transformer.

There are several different possibilities for connecting the at least two units to the transformer. One possibility is to have one individual full resonant tank for each unit and to connect two (or several) such units with individual full resonant tanks to the primary winding of the transformer. This however can lead to circulating current problems due to the fact that there are two individual resonant tanks. A particularly efficient solution therefore goes a different way and at least partially joins the resonant tanks, so there are not two truly individual resonant tanks for each unit but the at least two units are coupled into the same series loaded resonant tank. This is for example possible by providing a topology, in which there is at least one electronic component (inductor or capacitor) common to the connection of at least two units to the transformer apart from the primary winding of the transformer, which will be common in any case. This electronic component is effective in that it determines the resonant frequencies of the coupling of both units into the transformer and it joins the resonant tanks of the units avoiding circulating currents. This common component is preferably at least one capacitor preferably connected directly to the primary winding of the transformer.

According to a further preferred embodiment of the invention, first outputs of the at least two units are each connected to an individual first inductor, said first inductors of the units being arranged in parallel, and wherein these parallel inductors are connected to one single capacitor or to a group of capacitors in series or in parallel of the series loaded resonant tank. In regard to the inductors, each unit is individual in its resonant tank, but since there is a common capacitor (or group of capacitors) joined there is only one true resonant tank for the two units. Typically, the single capacitor or the group of capacitors in series or in parallel is preferably directly connected to a first pole of the primary winding of the transformer.

According to a further preferred embodiment of the converter according to the present invention, the second outputs of at least two units are connected each to an individual second inductor, said second inductors, respectively, being arranged in parallel and both connected to a second pole of the primary winding of the transformer.

Normally the primary circuit designated as the unit comprises at least one rectifier (which may be a diode bridge but which may also be an actively silicon controlled rectifier) rectifying alternating input current, and comprises at least one transistor bridge converting the resulting direct current into high frequency alternating current. Preferably, three phase input alternating current is rectified in the rectifier, wherein the resulting direct current is input to the transistor bridge via a DC link with two conductors, preferably comprising a filter element, said filter element for example given by at least one capacitor between the two conductors and/or optionally at least one inductor in at least one of the conductors (possible higher-order filtering), and wherein preferably the transistor bridge is a H-bridge with at least four switchable transistors.

According to a further preferred embodiment of the converter according to the present invention, said transformer transforms the high frequency alternating current, wherein the secondary winding of the transformer is connected to at least one high-voltage rectifier.

Typically, such a converter is rated for powers above 20 kW, preferably in the range of 20-200 kW and/or for output DC-voltages above 50 kV, preferably in the range of 50-150 kV.

The present invention furthermore relates to an electrostatic precipitator comprising a converter as detailed above.

Further embodiments of the present invention are outlined in the dependent claims.

BRIEF DESCRIPTION OF THE DRAWINGS

In the accompanying drawings preferred embodiments of the invention are shown in which.

DETAILED DESCRIPTION

Figure 1:
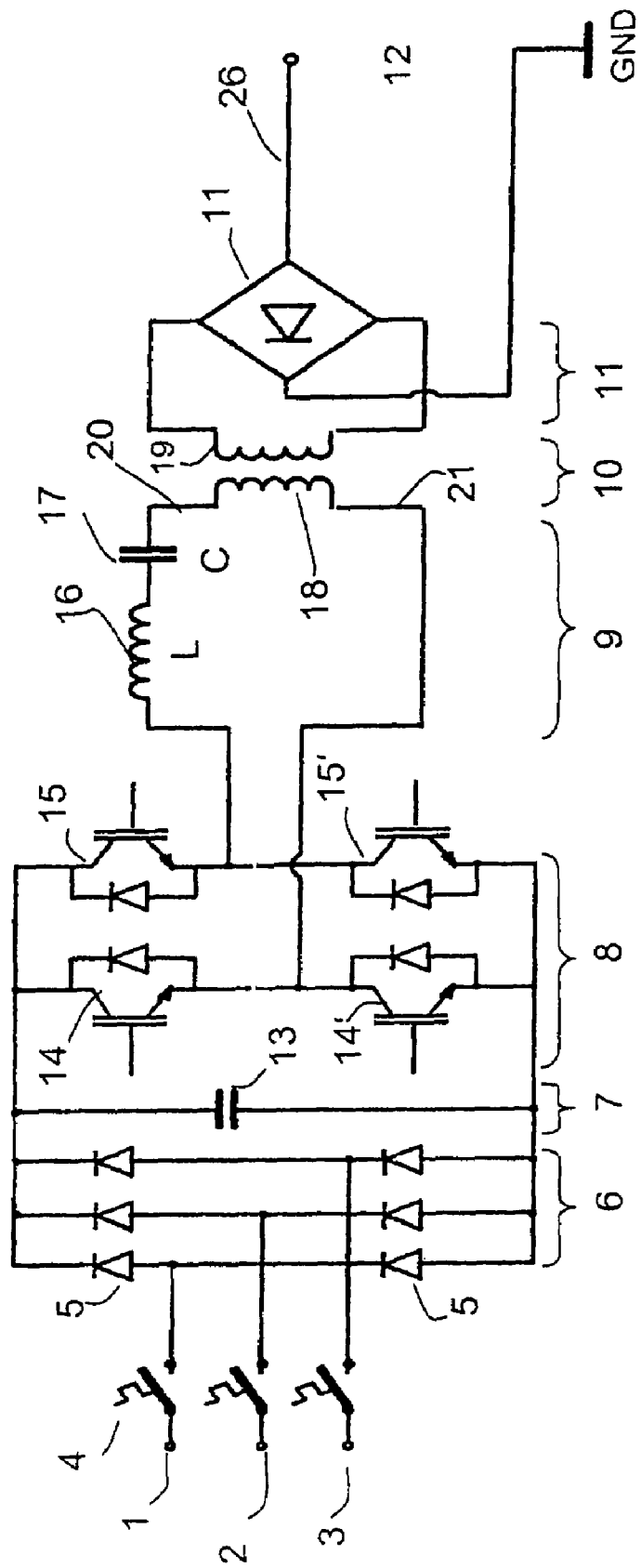
FIG. 1 shows a schematic circuitry of a series loaded resonant converter according to the state-of-the-art.

According to the present invention two (or more) primary circuits 22 (units 22) are connected to the primary winding 18 of the transformer 10, maintaining an equal load sharing among the circuits. The primary circuits 22 consisting of input rectifier 6, DC-link filter 7, and transistor bridge 8, are connected to a resonant tank.

Possible embodiments are
(1) connection at the output of the transistor bridges or
(2) connection at the primary of the transformer, so to have a resonant tank for each unit.

furthermore a connection
(3) at the output of the high-voltage rectifier, as such completely at the load side.

The load sharing in (1) is governed by parameters in the transistors, which cannot be controlled by the user. These are on-state voltage, switching speed and inductance, also the thermal behaviour will affect the current distribution. Such a design lacks flexibility.

The load sharing in (2) is governed by the inductor of the resonance tank. This will balance the load when operating at frequencies well away from resonance. Operation close to resonance will make the balancing highly and often almost incontrollably sensitive to the values of the components in the tank. Another drawback of (2) is that in case of a transistor failure (short circuit), both bridges are blocked.

Embodiment (3) suffers from the same problem as (2), this can partially be solved in (3) by individual control of the paralleled converters. (3) also incorporates separate transformers for the paralleled converters.

To illustrate the basic principle, in FIG. 2a) first a simplified illustration of the circuit according to FIG. 1 shall be given. In this simplified representation, the primary circuit normally comprising a rectifier 6, the DC link 7 and a transistor bridge 8 is illustrated by one single unit 22. This unit is connected to the series resonant tank 9, which in turn is connected to the transformer 10. The transformed alternating voltage is again rectified by a high-voltage rectifier 11.

Modularizing is now achieved in that the units 22 are basically duplicated (or triplicated, even a large number of units 22 is possible) while the resonant tank is at least partially shared as is the transformer. This is schematically indicated in FIG. 2b. Sharing of the resonant tank 23 is effected in a way such as to avoid circulating currents so such as have at least one common key element for the resonant properties of the resonant tank 23. In this specific case the resonant tank is joined by one single capacitor C', which is effective for both units 22, while the attachments to each units 22 have individual inductors L1 and L2. In this specific case, there is not only one inductor as given in FIG. 1 but there is one inductor L1 in the conductor, which is connected to first pole of the primary winding of the transformer via the capacitor C', and there is one additional inductor L2 for each unit 22 in the connection between each unit 22 and the second pole of the primary winding 18 of the transformer 10. Neglecting the inductor of the primary winding 18 of the transformer, the relevant inductor of the resonant tank 23 is given by the sum L1+L2, and the relevant capacitor of the resonant tank 23 is given by C'. Generally the values of the two (or multiple in case of multiple units 22) inductors L1 are chosen to be identical and also the values of the two (or multiple in case of multiple units 22) inductors L2 are chosen to be identical, while L1 and L2 can be equal or different, depending on the needs. In terms of having equal resonance frequencies for both units the sum L1+L2 is to be chosen to be identical for both attachments. For certain applications it may however also be desirable to have slightly different resonance frequencies for the units 22, so to have differing values for (L1+L2) for the two units and correspondingly different resonance frequencies.

Figure 2:
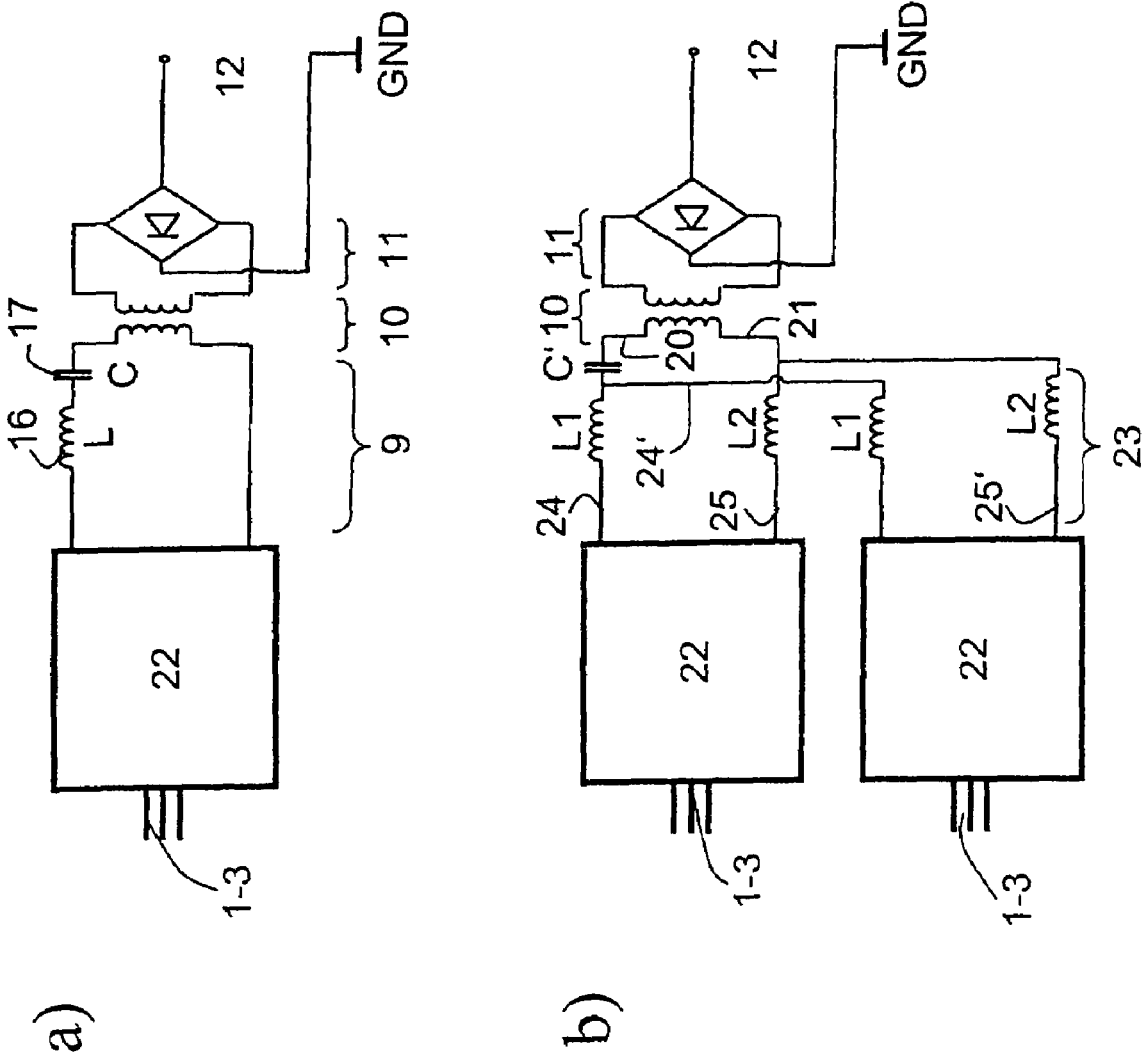
FIG. 2 a) shows a simplified schematic circuitry of a series loaded resonant converter according to the state-of-the-art; b) shows a schematic circuitry of a modularised series loaded resonant converter in a schematic simplified display.

So the proposed method, as illustrated in FIG. 2b, divides the resonance inductor into two equal parts, L1 and L2, which connects to the legs of the bridge. The paralleling is made at the output of these inductors; by doing this controlled load sharing, for all operating frequencies, is achieved. In addition redundancy is built into the system, as properly designed, the converter can still operate at a reduced power with a failed transistor. FIG. 2 shows two units 22, as an example, the invention can comprise any number of converters. Both half bridge and full bridge configurations are possible embodiments.

Figure 3:
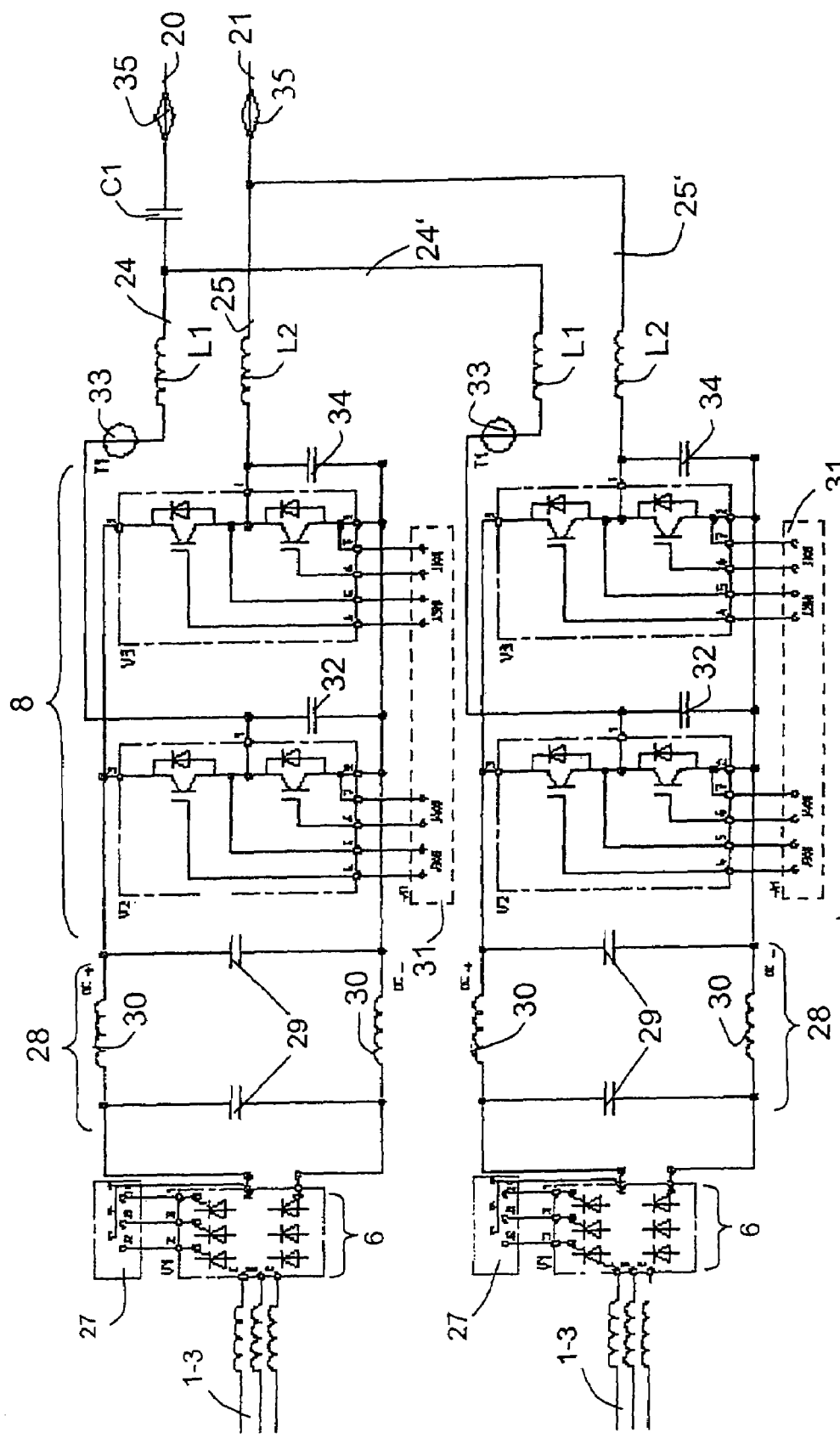
FIG. 3 shows a schematic circuitry of a modularised series loaded resonant converter in a schematic detailed display.

A more detailed topology is given in FIG. 3. In this case the three-phase rectifier bridge 6 is given by an actively controlled element, the control unit of which is referenced with reference numeral 27. Furthermore in this topology, in the DC link 28 there is located a higher order filter provided by two capacitors 29 and two inductors 30. The transistor bridge 8 is substantially identical to the one as illustrated in FIG. 1, in this case however additional snubber capacitors 32 and 34 are provided to the negative line. The control unit 31 for the transistor bridge 8 is also specifically indicated.

Furthermore there is indicated the possibility of a current sensor 33 the output of which can be used for the control. In this case the electronic part is attached to the transformer by means of two bushings 35. On the right-hand side of the display according to FIG. 3 the primary winding of the transformer is to follow.

LIST OF REFERENCE NUMERALS 1-3 three phases of the AC-mains
4 switches
5 diodes
6 three phase rectifier bridge
7 DC-link
8 transistor bridge, H-bridge
9 series resonance tank
10 transformer
11 high-voltage rectifier
12 load, precipitator
13 capacitor in 7
14, 15 transistors of 8
16 inductor of 9
17 capacitor of 9
18 single primary winding of 10
19 single secondary winding of 10
20,21 conductors (AC) between 8 and 9
22 unit including 6, 7 and 8
23 paralleled resonant tank
24 conductor of 23 including L1
25 conductor of 23 including L2
26 conductor between 11 and 12
27 control of 6
28 higher order filtered DC-link
29 capacitors of higher order filter in 28
30 inductors in higher order filter in 28
31 control of 8
32 snubber capacitor
33 current sensor
34 snubber capacitor
35 bushings to high voltage unit
L inductor of 9
C capacitor of 9
L1 first inductor of 23
L2 second inductor of 23
C' capacitor of 23

What is claimed is:

1. A high-voltage AC-DC or AC-AC converter converting alternating input current into high-voltage direct (DC) or alternating (AC) current to be provided to a load, said converter comprising:
a first unit configured to convert the alternating (AC) input current into high frequency alternating (AC) current, a second unit configured to convert the alternating (AC) input current into high frequency alternating (AC) current,
at least one transformer connected to the first unit and the second unit, the at least one transformer being configured to adapt the high frequency alternating (AC) current to requirements of the load, and including a primary winding and a secondary winding,
a series loaded resonant tank coupled between the first and second units and the transformer such that the first and second units are coupled into the series loaded resonant tank,
wherein the resonant tank includes at least one capacitor having a first end commonly connected to the first and second units, and a second end connected to the primary winding of the transformer,
wherein the at least one capacitor is configured to determine the resonance frequencies of the coupling of the first and second units into the transformer.

2. The converter according to claim 1, wherein the resonant tank comprises at least one first inductor and the at least one capacitor in series connected to a first pole of the primary winding of the transformer, and wherein the at least one capacitor is placed between the inductor and the primary winding of the transformer.

3. The converter according to claim 2, wherein a second inductor is placed between the first unit and a second pole of the primary winding of the transformer.

4. The converter according to claim 1, wherein the first and second units each have a first output are connected to a respective first inductor, which are arranged in parallel, and wherein the parallel inductors are connected to the at least one capacitor, which includes one of a single capacitor and a group of capacitors in series or in parallel.

5. The converter according to claim 4, wherein the one of the single capacitor and the group of capacitors in series or in parallel is connected to a first pole of the primary winding of the transformer.

6. The converter according to claim 1, wherein the first and second units each have an output connected to a respective inductor, which are arranged in parallel and connected to a pole of the primary winding of the transformer.

7. The converter according to claim 1, wherein the first unit comprises at least one rectifier configured to rectify the alternating input current to a direct current, and comprises at least one transistor bridge converting the resulting direct current into high frequency alternating current.

8. The converter according to claim 7, wherein the rectifier is configured to rectify a three phase input alternating current to the direct current and input the resulting direct current to the transistor bridge via a DC link with two conductors comprising a filter element, and wherein the transistor bridge is a H-bridge with at least four switchable transistors.

9. The converter according to claim 1, wherein said transformer is configured to transform the high frequency alternating current, and the secondary winding of the transformer is connected to at least one high-voltage rectifier.

10. The converter according to claim 1, wherein the converter is rated for powers above 20 kW and/or for output of DC-voltages above 50 kV.

11. The converter according to claim 1, wherein there are not more than two units connected to one common resonant tank.

12. An electrostatic precipitator comprising the converter according to claim 1.

13. The converter according to claim 5, wherein the first and second units each have a second output connected to a respective second inductor which are arranged in parallel and connected to a second pole of the primary winding of the transformer.

14. The converter according to claim 6, wherein the first unit comprises at least one rectifier configured to rectify the alternating input current to a direct current, and comprises at least one transistor bridge converting the resulting direct current into high frequency alternating current.

15. The converter according to claim 8, wherein said transformer is configured to transform the high frequency alternating current, and the secondary winding of the transformer is connected to at least one high-voltage rectifier.

16. The converter according to claim 9, wherein the converter is rated for powers above 20 kW and/or for output DC-voltages above 50 kV.

17. The converter according to claim 10, wherein there are not more than two units connected to one common resonant tank.

18. An electrostatic precipitator comprising the converter according to claim 11.

19. The converter according to claim 8, wherein the filter element comprises at least one capacitor between the two conductors and at least one inductor in at least one of the conductors.

20. The converter according to claim 10, wherein the converter is rated for powers in the range of 20-200 kW and/or for output of DC-voltages in the range of 50-150 kV.

* * * * *